United States Patent Office 2,838,485
Patented June 10, 1958

2,838,485

READILY SOLUBLE AND STABLE SALTS OF DI-(4-AMIDINO-PHENYL) - TRIAZENE - (N-1.3) AND A PROCESS OF PREPARING THEM

Richard Brodersen, Frankfurt am Main, Heinz Loewe, Kelkheim, Taunus, and Heinrich Ott, Eppstein, Taunus, Germany, assignors to Farbwerke Hoechst Aktiengesellschaft vormals Meister Lucius & Bruning, Frankfurt am Main, Germany, a corporation of Germany No Drawing. Application March 12, 1956
Serial No. 570,669

Claims priority, application Germany March 19, 1955

8 Claims. (Cl. 260—140)

The present invention relates to readily soluble and stable salts of the di-(4-amidino-phenyl)-triazene-(N-1.3) and to a process of preparing them.

In U. S. Patent No. 2,673,197 is described a process for preparing the di-(4-amidino-phenyl) - triazene - (N - 1.3) which corresponds to the formula

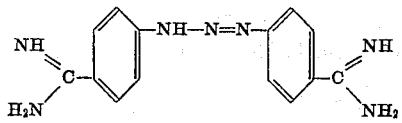

and is known to be a medicament having an excellent action on blood parasites. It is, however, difficult to prepare from this compound aqueous solutions, since the salts hitherto known are not sufficiently soluble in water and are, therefore, not suitable for use in therapeutics.

Now we have found that readily soluble and at the same time sufficiently stable salts of the di-(4-amidino-phenyl)-triazene-(N-1.3) can be prepared by reacting di-(4-amidino-phenyl)-triazene-(N-1.3) in the form of a solution or a suspension with an acylated amino acid corresponding to the formula

wherein R represents an aliphatic acyl radical containing at most 4 carbon atoms and X represents an alkylene group.

As acylated amino acids suitable for use in the process of this invention there come into consideration especially compounds which correspond to the aforementioned formula wherein X stands for an alkylene group containing 1 to 5 carbon atoms. As acids of this kind there may be mentioned more especially: aceturic acid, β-acetylamino-propionic acid, omega-acetylamino-capronic acid, propionyl glycine and butyryl glycine.

The novel salts of the present invention have the following structural formula:

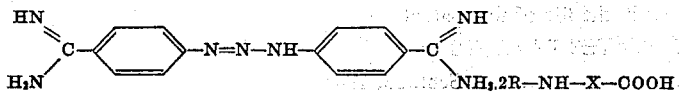

wherein R and X have the meanings indicated hereinabove.

The process according to this invention may be conducted for example in the following manner:

Solutions of acylated amino acids in water or an organic solvent are stirred with di-(4-amidino-phenyl)-triazene-(N-1.3) and the mixture obtained is diluted with water until complete dissolution has occurred. After cooling the solution so prepared, the desired salt crystallizes out after some time. As organic solvents lower aliphatic alcohols may be used with particular advantage.

The process of this invention may also be performed as follows:

A suspension of di-(4-amidino-phenyl)-triazene-(N-1.3) in water or an organic solvent is combined with an aqueous solution of the acylated amino acid. From the solution so obtained the salt can be precipitated by crystallization, for example by cooling or adding a solvent in which the salt formed is insoluble or for example by adding acetone until turbidity occurs.

It is also possible to mix a suspension of di-(4-amidino-phenyl)-triazene-(N-1.3) in an organic solvent with the acylated amino acid and to precipitate the salt from the solution obtained by adding, for example, ethyl acetate.

Finally it is possible to combine a solution of the acylated amino acid in an organic solvent with a suspension of di-(4-amidino-phenyl)-triazene-(N-1.3) in water and to separate the salt from the clear solution obtained by adding, for example, isopropanol.

The formation of the salt may be accelerated by stirring or shaking or carefully heating the mixture that contains the components.

The salts of the di-(4-amidino-phenyl)-triazene-(N-1.3) obtained according to this invention exhibit approximately the same tolerability and a corresponding efficiency against blood parasites, and are more readily soluble in water and more stable than the salts already known.

The following examples serve to illustrate the invention, but they are not intended to limit it hereto:

Example 1

23.4 grams of aceturic acid are dissolved in 450 cc. of hot methanol and the solution obtained is stirred with 28.1 grams of di-(4-amidino-phenyl)-triazene-(N-1.3). The end solution obtained is diluted at 60 to 70° C. with water until completely dissolved and then allowed to stand for 1 day at about 0° C. 37 grams of the salt of diaceturic acid are separated in the form of crystals which melt at 202° C. with decomposition.

100 parts of water dissolve at 20° C. 10 parts of the salt so obtained.

Example 2

28.1 grams of di-(4-amidino-phenyl)-triazene-(N-1.3) are suspended in 300 cc. of hot methanol and 75 cc. of an aqueous solution of 35 percent strength of β-acetylamino-propionic acid are then added to the suspension obtained. To the mixture that has become clear acetone is added until turbidity occurs, and it is then stored in a refrigerator for crystallization. 40.5 grams of the salt of di-β-acetyl-amino-propionic acid are obtained; it melts at 220° C. with decomposition.

100 parts of water dissolve at 20° C. 20 parts of the salt so obtained.

Example 3

20 grams of omega-acetylamino-capronic acid are added to a suspension of 14 grams of di-(4-amidino-phenyl)-triazene-(N-1.3) in 250 cc. of ethyl alcohol, the solution obtained is filtered until clear and the salt is precipitated with 250 cc. of ethyl acetate. The salt of di-omega-acetyl-amino-capronic acid is obtained in a yield of 25 grams. The salt melts at 200° C. with decomposition.

100 parts of water dissolve at 20° C. 25 parts of the salt so obtained.

Example 4

7.86 grams of propionyl glycine are dissolved in 50 cc.

of methanol and the solution so obtained is added to a suspension of 8.43 grams of di-(4-amidino-phenyl)-triazene-(N-1.3) in 40 cc. of water. By adding isopropanol to the clear solution so obtained 11 grams of the salt of di-propionyl amino acetic acid are separated; it melts at 217° C. with decomposition.

100 parts of water dissolve at 20° C. 2 to 3 parts of the salt so obtained.

*Example 5*

2.90 grams of butyryl glycine are dissolved in 15 cc. of methanol and the solution obtained is added to a suspension of 2.81 grams of di-(4-amidino-phenyl)-triazene-(N-1.3) in 15 cc. of water. Acetone is added to the clear solution obtained and the salt of di-butyrylamino acetic acid precipitates; it melts at 215° C. with decomposition.

100 parts of water dissolve at 20° C. 2 parts of the salt so obtained.

We claim:

1. Readily soluble and stable salts of the general formula

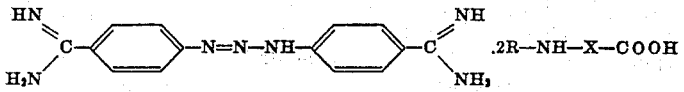

wherein R represents an aliphatic acyl radical containing at most 4 carbon atoms and X represents an alkylene group with at most 5 carbon atoms.

2. The compound of the formula

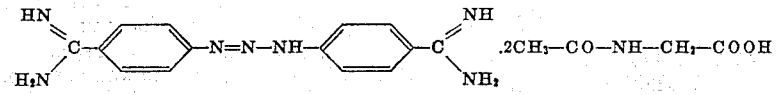

3. The compound of the formula

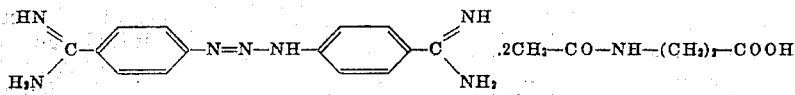

4. The compound of the formula

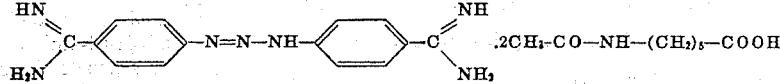

5. The compound of the formula

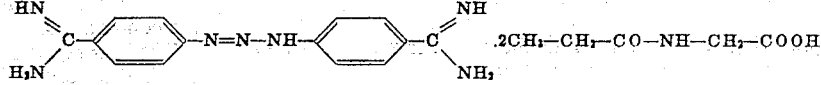

6. The compound of the formula

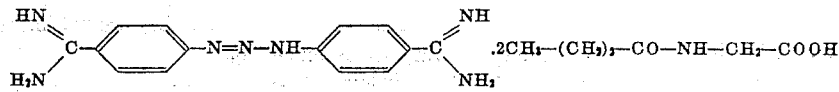

7. The process for preparing readily soluble and stable salts of the general formula

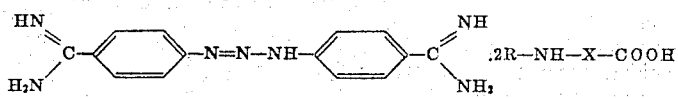

wherein R represents an aliphatic acyl radical containing at most 4 carbon atoms and X represents an alkylene group with at most 5 carbon atoms, which comprises contacting in an inert liquid medium di-(4-amidino-phenyl)-triazene-(N-1.3) with an acylated amino acid corresponding to the formula

R—NH—X—COOH wherein R and X have the meanings given above.

8. The process as claimed in claim 7, wherein the acylated amino acid is aceturic acid.

References Cited in the file of this patent

UNITED STATES PATENTS

| | | |
|---|---|---|
| 2,256,759 | Ham | Sept. 23, 1941 |
| 2,279,514 | Ham et al. | Apr. 14, 1942 |
| 2,673,197 | Jensch | Mar. 23, 1954 |

OTHER REFERENCES

Chem. Abst., vol. 24, page 2990 (1930).